H. BROOKE.
MOLD FOR GLASS-SHADES, &c.
No. 191,103.　　　　　　　　　　　Patented May 22, 1877.
Fig. 1.
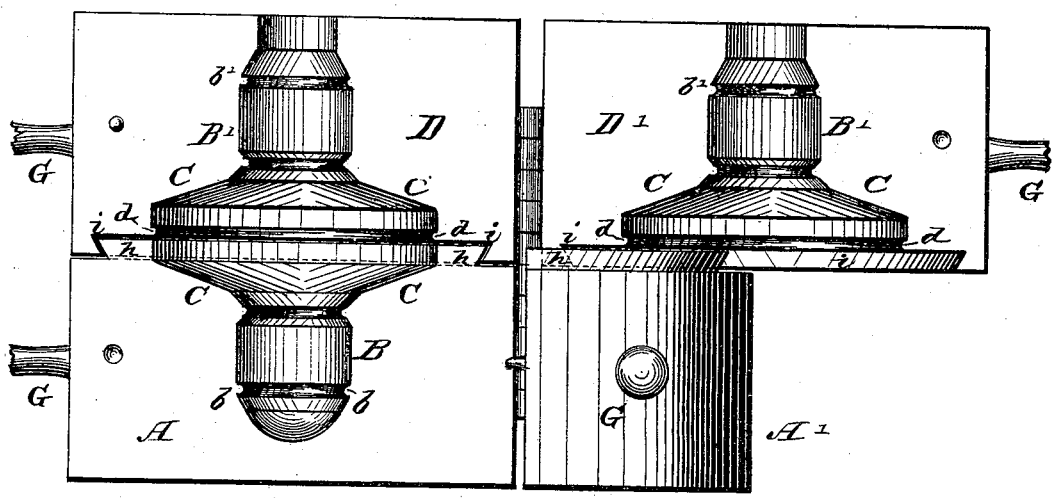
Fig. 2.
Fig. 3.
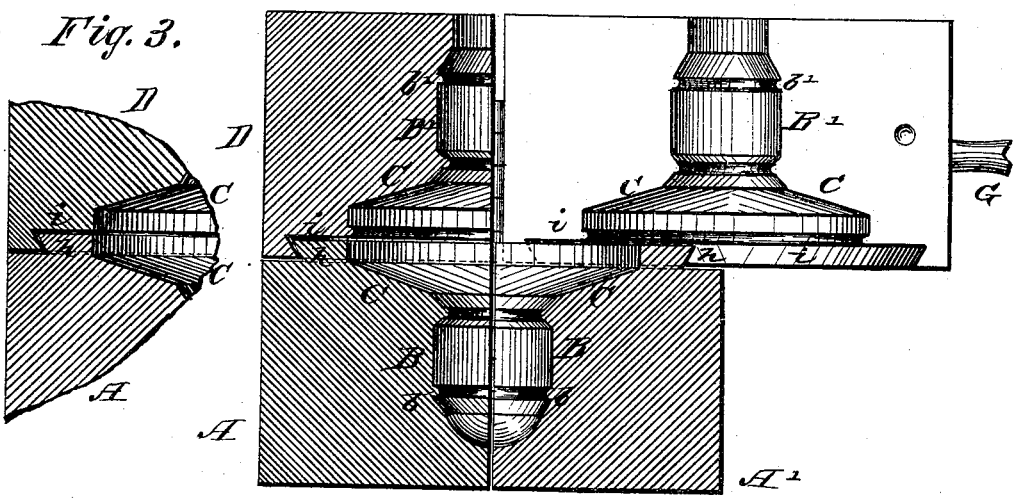
Witnesses:　　　　　　　　　　　Inventor:
　　　　　　　　　　　　　　　　Homer Brooke
　　　　　　　　　Per C. H. Watson & Co. Attorneys.

UNITED STATES PATENT OFFICE.

HOMER BROOKE, OF NEW YORK, N. Y., ASSIGNOR TO BENNETT B. SCHNEIDER, OF SAME PLACE.

IMPROVEMENT IN MOLDS FOR GLASS SHADES, &c.

Specification forming part of Letters Patent No. 191,103, dated May 22, 1877; application filed May 14, 1877.

*To all whom it may concern:*

Be it known that I, HOMER BROOKE, of New York, in the county of New York and State of New York, have invented certain new and useful Improvements in Molds for Glass Shades, &c.; and I do hereby declare that the following is a full, clear, and exact description thereof, which will enable others skilled in the art to which it appertains to make and use the same, reference being had to the accompanying drawing, and to the letters of reference marked thereon, which form a part of this specification.

This invention relates to my improvement described in a former application for molds for shades; and it consists in the construction of a compound mold, having a blow-over at the top and bottom, and an improved means of separation in the center, whereby two shades may be blown at the same time and afterward easily separated, as will be hereinafter more fully set forth.

In the annexed drawing, Figure 1 represents my compound mold in side elevation, the upper part being open and one of the lower parts closed. Fig. 2 is a central vertical section of the same with one of the upper parts open; and Fig. 3 is a detail view, showing a modification of the same.

A A' represent the two lower parts, constructed to form an inverted shade—that is to say, in the center, at the bottom, is the cylindrical part B, forming the top of the shade, and in the top is the concavity C, for forming the body of the same. At the lower end of the cylindrical aperture B is formed the circumferential groove $b$, which forms what is called by glass-blowers a "blow-over." The upper molds D D' are constructed, as shown, with cylindrical aperture B', cavity C, and circumferential groove $b$. Around the lower edge of the cavity C, in the molds D D', is formed an inward projection, $d$, which forms in the shade, when blown, an inward-projecting groove, or it may be left plain, as shown in a modification, Fig. 3; and this is what constitutes an improvement, as a means of separation of the two shades after being blown, upon my former application. The four molds are provided with handles G G'. On the upper faces of the bottom molds A A' is formed an annular flange, $h$, having its outer side beveled or inclined, and on the lower faces of the upper molds D D' is formed a corresponding flange, $i\ i$, to fit around the flange $h$ when the molds are closed, thus forming proper stops and connections between the two sets of molds.

The blower places his glass in the form of a half-blown globe on the top of the bottom molds, which form a resting-place for the same, and presses down on the glass so as to half fill the cavity C, more or less. The top molds D D' are then closed and the blowing completed within the entire closed mold, and the glass will be uniform in thickness throughout, which it would not be if the glass were inserted from one side.

Having thus fully described the invention, what is claimed as new, and desired to be secured by Letters Patent, is—

A compound mold for shades, having an inward projection or surface, $d$, in the center, and blow-overs at the top and bottom, whereby the two shades may be blown at the same time and afterward easily separated, substantially as herein set forth.

In testimony that I claim the foregoing as my own I affix my signature in presence of two witnesses.

HOMER BROOKE.

Witnesses:
   G. H. BOUTON,
   E. S. DRAKE.